Inventor
J. F. Pont,
By H. R. Kerslake
Attorney

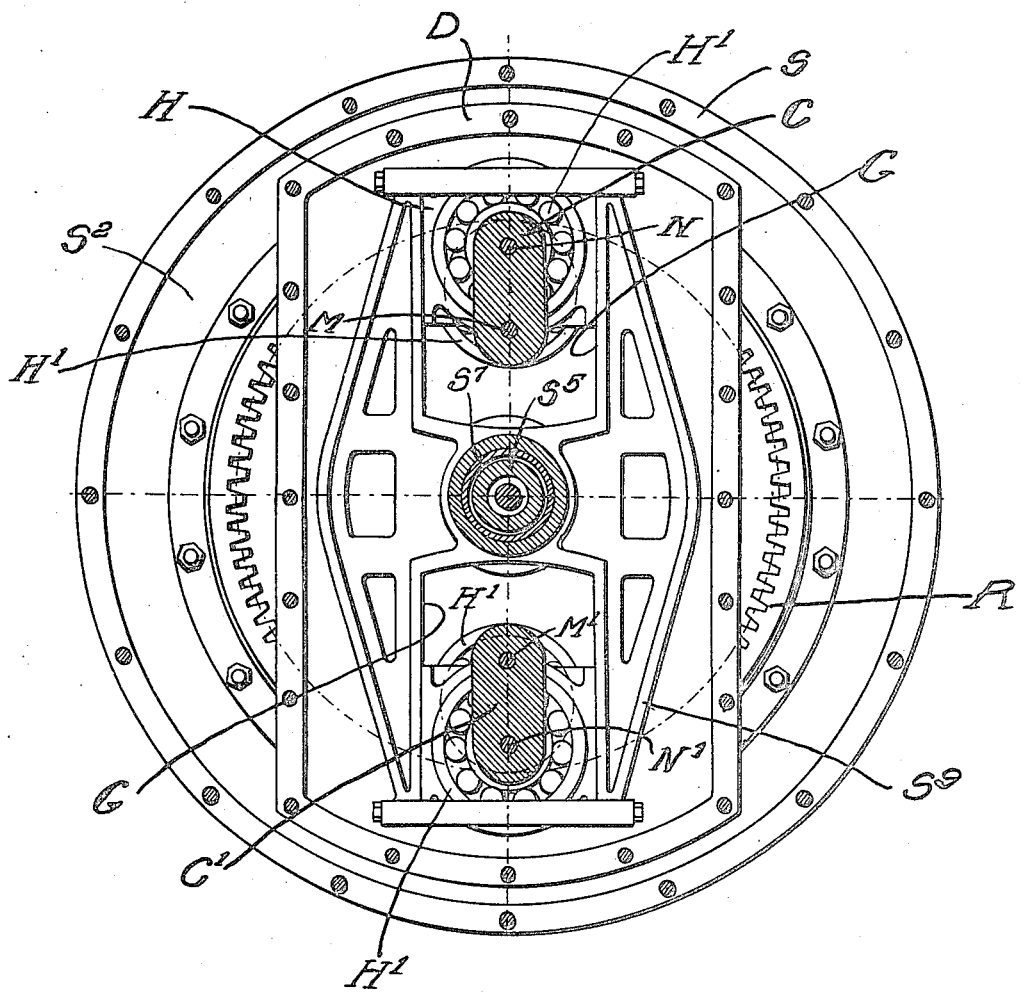

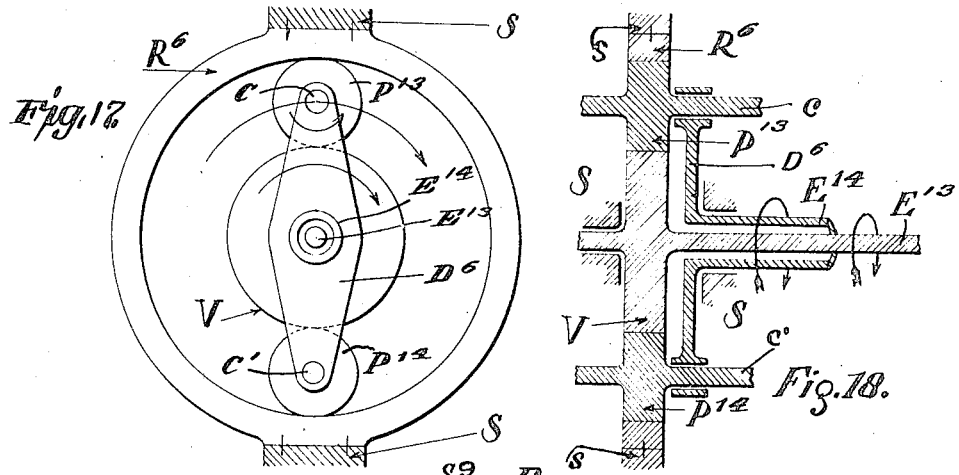
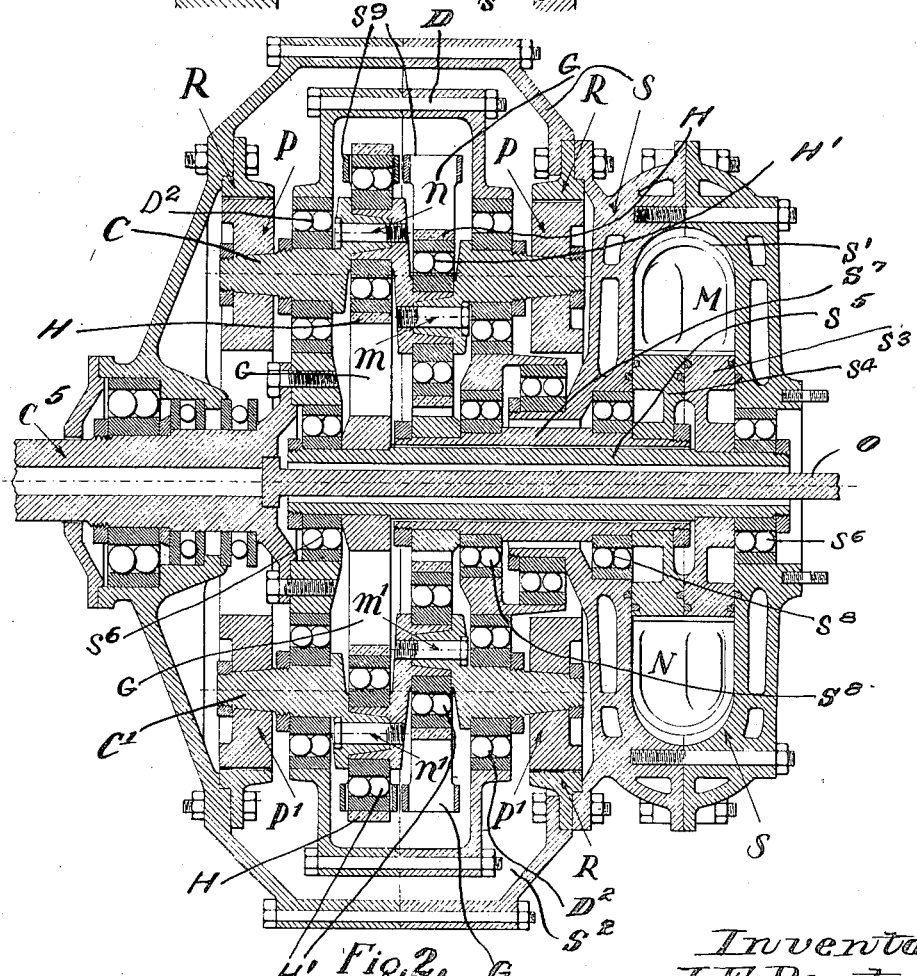

Apr. 17, 1923. 1,452,125
J. F. PONT
INTERNAL COMBUSTION ENGINE
Filed Dec. 9, 1919 6 Sheets-Sheet 5
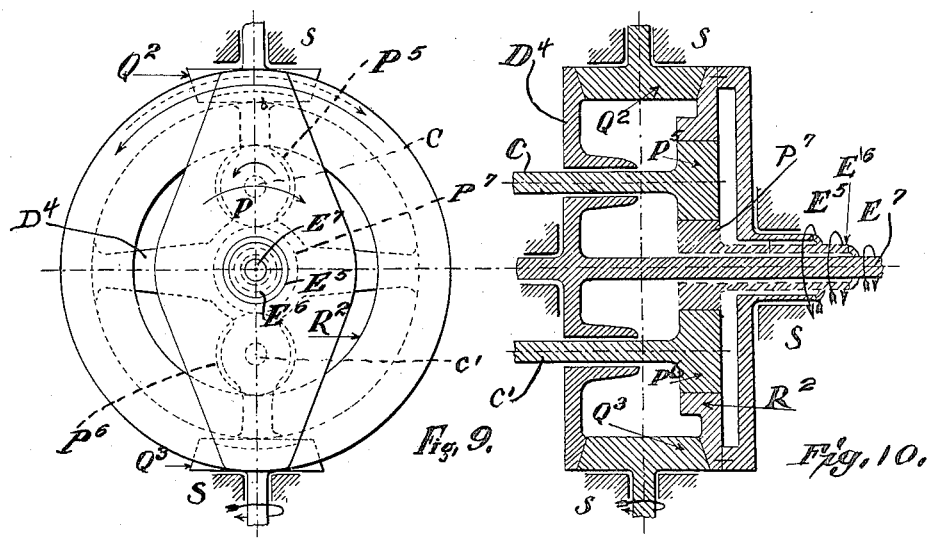
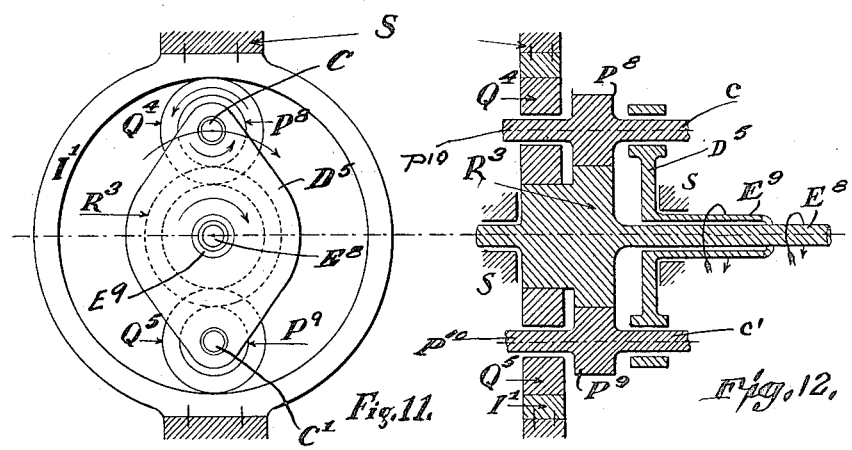
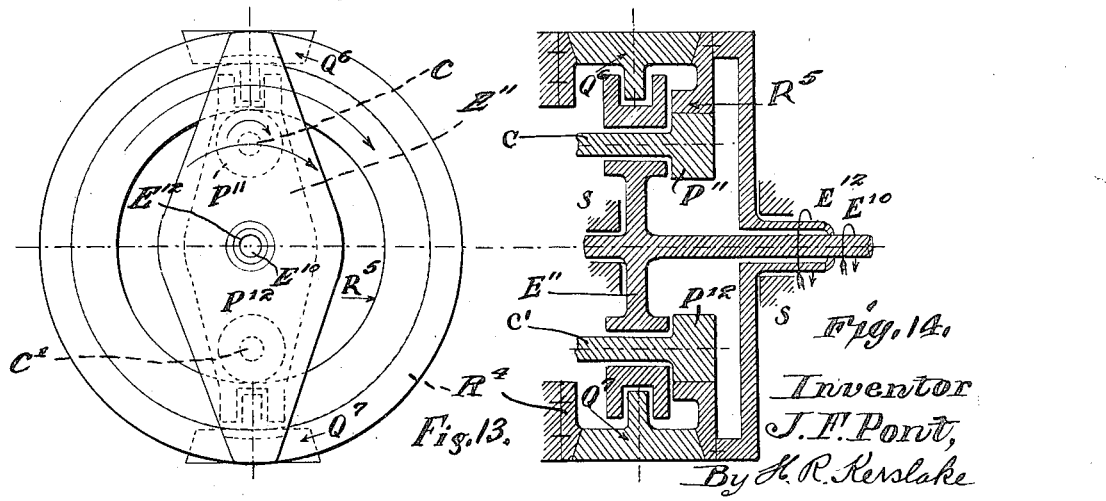
Inventor
J. F. Pont,
By H. R. Kerslake
Attorney

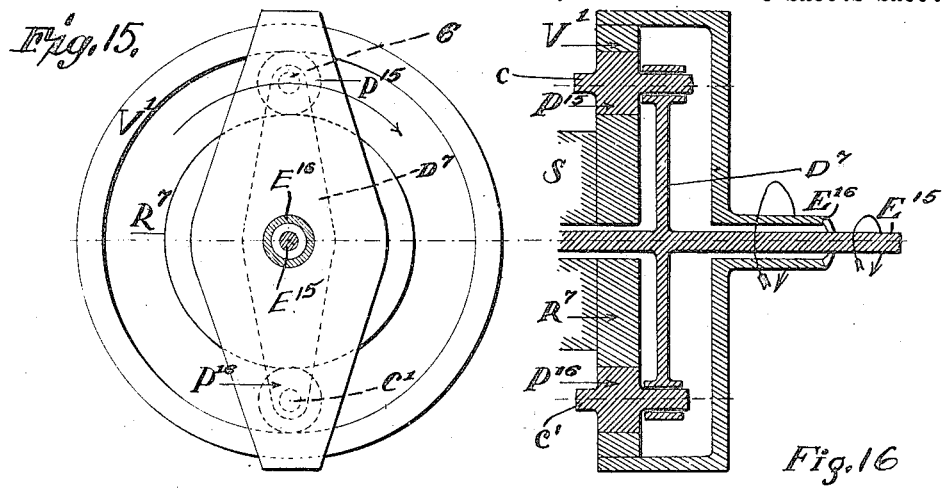

Patented Apr. 17, 1923.

1,452,125

UNITED STATES PATENT OFFICE.

JOSÉ FONS PONT, OF BARCELONA, SPAIN.

INTERNAL-COMBUSTION ENGINE.

Application filed December 9, 1919. Serial No. 343,650.

(GRANTED UNDER THE PROVISIONS OF THE ACT OF MARCH 3, 1921, 41 STAT. L., 1313.)

*To all whom it may concern:*

Be it known that I, José Fons Pont, a subject of the King of Spain, residing at Barcelona, Spain, have invented certain new and useful Improvements in an Internal-Combustion Engine (for which I have filed an application in Spain, August 16, 1918, Patent Number 67,680); and I do hereby declare the following to be a full, clear, and exact description of the invention, such as will enable others skilled in the art to which it appertains to make and use the same.

My invention relates to rotary internal combustion engines of the well known type comprising an annular stationary chamber provided with admission ports, ignition plugs and exhausting ports. In the interior of said chamber, work two sets of pistons disposed alternately and revolving with alternately increasing and diminishing speeds, so that the spaces comprised between each two consecutive pistons increase and diminish alternately, at the same time as they move in the interior of the annular chamber, and pass before the admission ports, the ignition plugs and the exhausting ports, in order to produce the four phases of the cycle.

In some engines of this class, the pistons are fixed to the two discs or rings revolving round the engine-shaft so arranged that all the pistons of one set are fixed to one of the discs or rings, and the pistons of the other set are fixed to the other disc or ring. Said two discs or rings are connected together and with the engine-shaft by means of a mechanism which controls conveniently the movement of said discs or rings and therefore of the pistons, so that, the spaces between each two consecutive pistons will increase and diminish alternately so as to produce the four phases of the cycle of the motor.

It has been proposed in motors of this type to employ gears of the planetary type to control the movements of the discs or rings which carry the pistons but in these engines the movements of the pistons are not fitted for the efficient working of the engine, because, on the first hand, the points of the planetary pinions connected to the rings which carry the pistons, are not located in symmetric positions and on the second hand, because the connection between these points and the rings is effected with the interposition of connecting rods which alter unfavorably the cyclical movements of the gears.
For these reasons it is almost impossible to balance the known engines and moreover the motors will not operate efficiently.

An object of my invention is to obtain a motor of this class of simple and durable construction, which avoids all the inconveniences of the well known motors of this type and the movements of the groups of pistons are regular ones so that the engine will be balanced and operate practically.

My invention consists particularly in the disposition of one or more stationary toothed rings connected to a fixed part of the motor and one or more pinions which mesh with these rings and have their axes revolve concentric to the rings. Each of these pinions has two eccentric points or cranks diametrically opposite each other and coupled to the two rings which carry the pistons so that the cyclical movement of these two diametrically opposite points or cranks of the pinions, is exactly transmitted to the two rings which carry the pistons. For accomplishing this object, the pinions have shafts which each have two eccentric points or two cranks diametrically opposed and carrying slides which operate in guides or forks attached respectively to the two rings which carry the pistons, said guides or forks being provided with radially disposed slots in which these slides operate.

The invention is illustrated in the accompanying drawings in which:

Figure 1 is a vertical sectional view of one form of the improved engine taken through the crank shafts.

Fig. 1ª is a similar view taken through the piston chamber.

Fig. 2 is a longitudinal sectional view of the same engine.

Figs. 9 and 10 are a side view and a sectional view respectively of another form of power transmitting mechanism.

Figs. 11 and 12, and 13 and 14 are similar views of different forms of power transmitting mechanism.

Figs. 15 and 16, and 17 and 18 are similar views of still different forms of power transmitting mechanism.

For the purpose of the following detailed description it may be stated that certain parts of the power transmitting mechanism are eliminated from Figures 7 to 18 inclusive as such construction may be readily understood without illustrating the omitted parts.

Figure 1A:
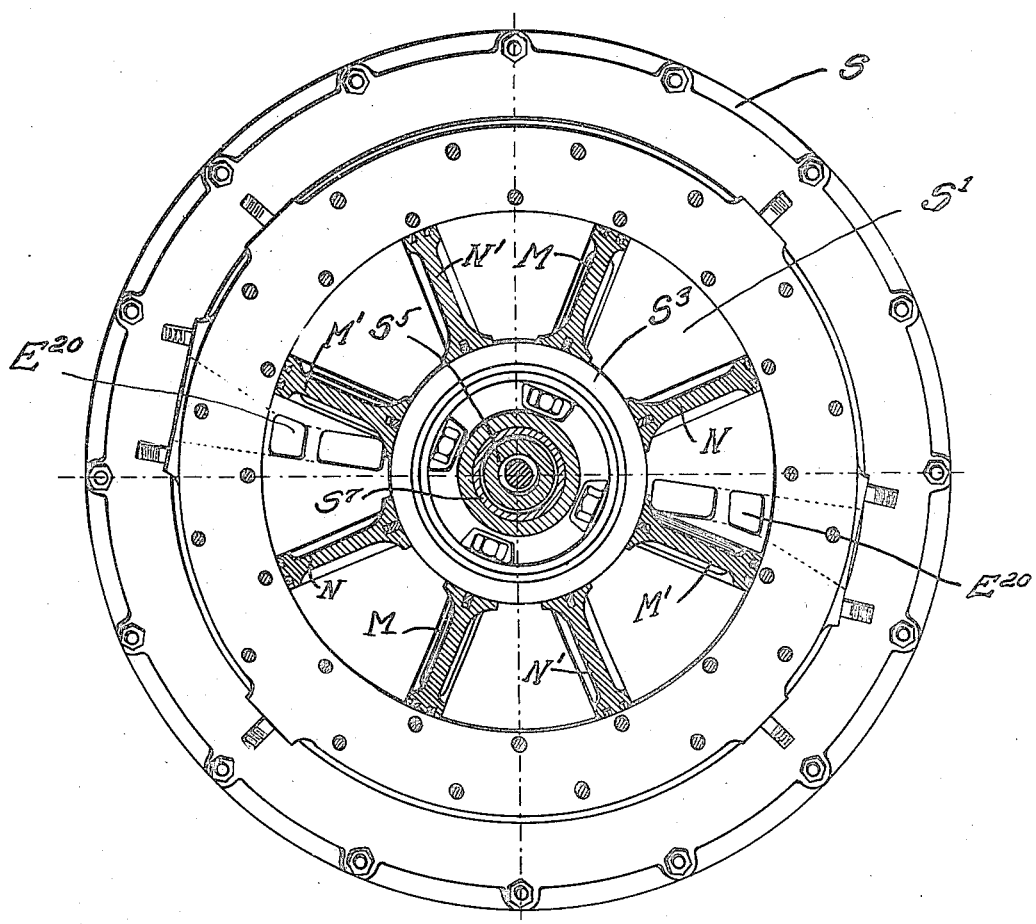
Figure 3:
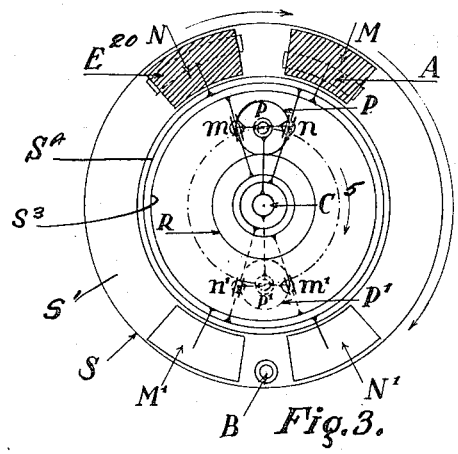
Fig. 3 is a diagrammatic view of the engine showing the pistons in a position in which one of the pistons is about to start its suction stroke.
Figure 4:
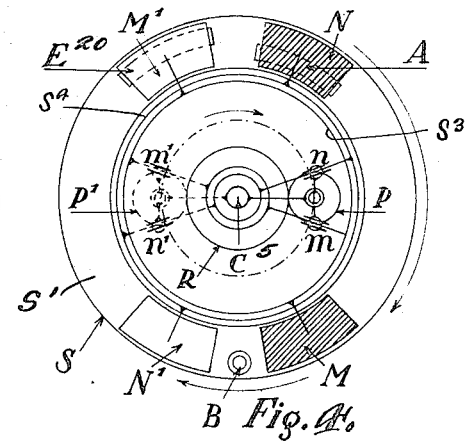
Fig. 4 is a similar view but showing the same mentioned piston near the completion of its suction stroke.
Figure 5:
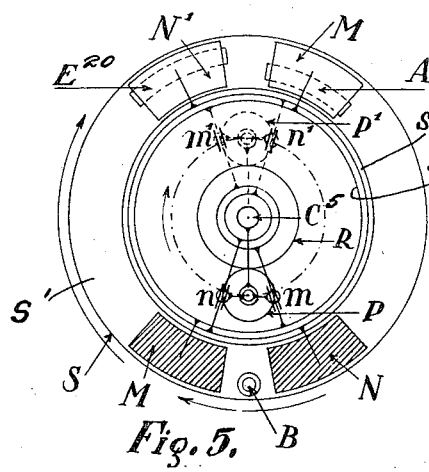
Fig. 5 is a similar view showing a following piston which has compressed the mixture drawn in between the following piston and the first mentioned piston.
Figure 6:
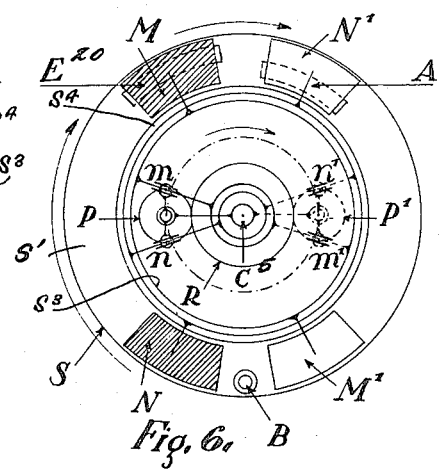
Fig. 6 is a similar view showing the positions of the two pistons after the first mentioned piston has completed its working stroke and the following piston in position to eject the exhaust gases.

Referring to Figures 1, 1a and 2, S designates a casing which houses a piston chamber S' and a transmission mechanism chamber S².

Mounted in the chamber S' for rotating movement, are a plurality of rings S³ and S⁴, the ring S³ being fixed to a sleeve S⁵ which is rotatably mounted in bearings S⁶. The ring S⁴ is fixed to a sleeve S⁷ which surrounds the sleeve S⁵ and is rotatably mounted in bearings S⁸. The ring S³ carries a series of radially extending spaced pistons M and M'. These pistons are spaced apart 90°. The ring S⁴ carries a series of radially disposed spaced pistons N and N'. It will be seen that in the form shown in Figures 1 and 1a each of the rings carries four pistons and that the pistons of each ring are arranged 90° apart.

As shown diagrammatically in Figures 3 to 6 inclusive, the chamber S' is provided with an inlet port A, an exhaust port E²⁰, and a spark plug B, and in operation a piston M on the ring S³, is moved away from the inlet A in order to draw fuel into the chamber S'. As this piston moves forwardly a succeeding piston N carried by the ring S⁴ will move into the position formerly occupied by the first mentioned piston, while the first mentioned piston M will move forward towards a preceding piston N' of the other ring. After the first mentioned piston M, as shown in Figures 3 to 6 has moved from the position occupied in Figure 3 to the position shown in Figure 4, it will be moved past the spark plug B to the position shown in Figure 5. At the same time the piston N will have moved toward the piston M to compress the mixture between the same, then when the explosion takes place the piston M will be driven forwardly to the position shown in Figure 6 and on a subsequent cycle the piston N will drive out the exhaust gases between the pistons M and N. Figures 3 to 6 show each ring as being connected to only two pistons which are arranged substantially diametrically opposite to one another but in the actual construction I prefer to employ four pistons on each ring as shown in Figures 1 and 1a.

In order that the pistons on one ring will alternately move toward and away from the pistons on the other ring, I have provided the improved transmission mechanism which will now be described.

Each of the sleeves S⁵ and S⁷ carries a fixed cross-head S⁹, which cross-heads are provided with radially disposed slots G in which slide blocks H. Each block is mounted on a ball bearing H' carried by cranked portions $m$, $m'$, $n$, and $n'$ forming part of crank shafts C and C'. It will be noted that the cranked portions of each crank shaft are arranged diametrically opposite one another so that rotation of the crank shaft will first move one cross-head S⁹ in one direction and the other cross-head in an opposite direction. In other words the rotation of each crank shaft will cause alternate oscillation of the cross-heads S⁹ in opposite directions and this will cause the pistons of one ring to move alternately towards and away from the pistons of the other ring. When the explosion in the piston chamber drives a piston forward it will cause the cross-head S⁹ which is actuated by that piston to also move forward. Each crank shaft C and C' is provided at its ends with fixed pinions P and P' which mesh with stationary integral gears R fixed to the casing S. It will, therefore, be seen that the movement of one of the cross-heads by a piston which is operatively connected to the same, will cause the pinions P, P' to also move in the same direction as the cross-head. As the pinions move in this direction they will be revolved by the stationary gears R and consequently the crank portions of the shafts C, C' will cause an opposite movement of the other cross-head.

The crank shafts C and C' are rotatably mounted in bearings D² carried by a rotatable member D, which rotates around the axis of the shaft O and is provided with an axial extension C⁵ which functions as the driven shaft of the engine. The shaft C⁵ is connected with the shaft O so that power may be taken from both ends of the engine.

Figure 7:
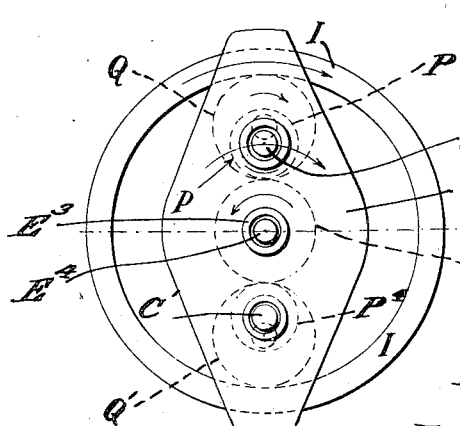
Fig. 7 is a diagrammatic side view of one form of transmission mechanism which may be used in connection with the engine for the purpose of driving a plurality of shafts at different speed.
Figure 8:
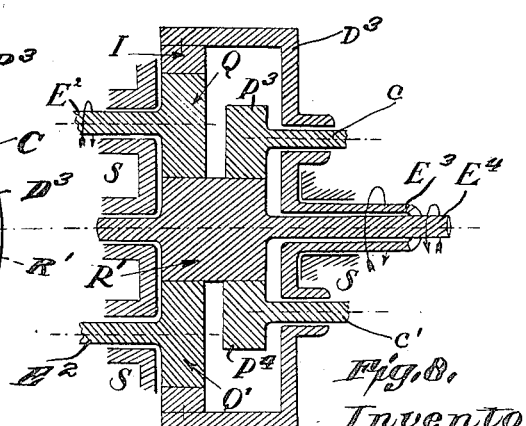
Fig. 8 is a longitudinal sectional view of the last mentioned figure.

In the modification shown in Figures 7 and 8, P³ and P⁴ designate pinions which are mounted on the crank shafts C and C'; the cranked portions of these shafts are omitted in these views. In this modification the rotatable member D³ carries the crank shafts and pinions and is driven by the pistons through the crank shafts in the manner indicated in Figures 1 to 6. The rotatable member $D^3$ has an internal gear I that drives pinions Q and Q' which are mounted on shafts $E^2$ that rotate in the casing S. The pinions Q Q' transmit movement to the pinion R' which causes rotation of the pinions P. In this form the pinion or gear R' will be rotated in a direction opposite to that of the pinions P and power may be taken from the sleeve $E—E^3$ or the shafts $E^4$ and $E^2$. It will also be understood that the sleeve $E—E^3$ and shafts $E^4$ and $E^2$ are driven at different speeds relatively to one another.

In the embodiment of the invention illustrated in Figures 9 and 10, $D^4$ designates a rotatable member in which are journaled the crank shafts C and C' which carry the pinions $P^5$ and $P^6$. It will be understood that the crank shafts C and C' are connected to rotatable cross-heads such as $S^9$ in Figure 2, in order that the pistons of the engine will function to rotate the member $D^4$. The member $D^4$ drives a plurality of beveled gears $Q^2$ and $Q^3$ which are journaled in the frame S. The beveled gears $Q^2$ and $Q^3$ drive a similar gear $R^2$ and this gear is provided with internal teeth which mesh with the teeth of the pinions $P^5$ and $P^6$, so that the gear $R^2$ revolving in one direction will drive the pinions $P^5$ and $P^6$ in an opposite direction, and this rotation of the pinions will cause their crank shafts C and C' to actuate the cross-heads to which they are connected. The pinions $P^5$ and $P^6$ drive a pinion $P^7$ and in this form of the invention it will be understood that power may be taken from the shafts of either one of the bevel gears $Q^2$ $Q^3$, the sleeves $E^5$ and $E^6$ and the shaft $E^7$. It is also apparent that these shafts and sleeves will revolve at relatively different speeds.

In the form of the transmission mechanism illustrated in Figures 11 and 12, $D^5$ designates the rotatable member which carries the crank shafts C and C', and it will be understood that these crank shafts are connected to a cross-head in a manner similar to that shown in Figures 1 and 2. The pressure exerted on the pistons in the engine will through the cross-heads and crank shafts cause rotation of the member $D^5$ and the pinions $P^8$ and $P^9$. These pinions have shaft extensions $P^{10}$ on which are rotatably mounted pinions $Q^4$ and $Q^5$ which mesh with a stationary internal gear I' fixed to the casing S. As the pinions $P^8$ and $P^9$ have a planetary movement about the axis of the shaft $E^8$ the pinions $Q^4$ and $Q^5$ will be revolved through their engagement with the gear I'. This rotation of the pinions $Q^4$ and $Q^5$ is utilized for driving the gear $R^3$ which has teeth meshing with the pinions $Q^4$ and $Q^5$. The gear $R^3$ has a second set of teeth which mesh with the teeth of the pinions $P^8$ and $P^9$ for the purpose of driving the crank shafts C and C'. In this form of the invention the sleeve $E^9$ and the shaft $E^8$ are employed for transmitting movement from the engine.

In the embodiment of the invention illustrated in Figures 13 and 14 another form of the transmission is used. In this case the rotatable shaft $E^{10}$ carries a fixed web $E^{11}$ in which are journaled the crank shafts C and C' which carry the pinions $P^{11}$ and $P^{12}$. The web $E^{11}$ during rotation carries beveled gears $Q^6$ and $Q^7$ which mesh with a fixed gear $R^4$ and drive a rotatable gear $R^5$, and the gear $R^5$ has internal teeth which mesh with and drive the pinions $P^{11}$ and $P^{12}$. With this construction the sleeve $E^{12}$ and shaft $E^{10}$ form the driven shafts of the engine.

A further modified form of the transmission mechanism is illustrated in Figures 15 and 16 in which $D^7$ designates the rotatable member in which are journaled the crank shaft C and C' of the pinions $P^{15}$ and $P^{16}$. The pinions engage an internal stationary gear $R^7$ which causes rotation of the pinions as the same revolve around the axis of the shaft $E^{15}$. The movement of the pinions is employed for driving a gear V' which imparts movement to the shaft $E^{16}$. In this modification power may be taken from the shaft $E^{15}$ or the sleeve $E^{16}$.

In the modified form of transmission illustrated in Figures 17 and 18, $D^6$ designates a rotatable member in which are journaled the ends of crank shafts C and C' which carry the pinions $P^{13}$ and $P^{14}$. These pinions mesh with a fixed gear $R^6$ and drive an internal gear V which is fixed to a rotatable member $E^{13}$. In this form the shaft $E^{13}$ and sleeve $E^{14}$ are employed for transmitting motion from the engine.

It will be understood from the foregoing description of the various modifications of the transmission mechanism that various mechanical movements may be provided and driven by the pistons of the engine.

From the foregoing I believe the construction and operation of my improved engine will be readily understood by those skilled in the art, and I am aware that various changes may be made in the construction illustrated without departing from the spirit of the invention as set forth in the following claims.

1. In an explosion motor of the described type, two sets of pistons revolving in the interior of an annular chamber or casing, two rings upon which are fixed respectively the pistons of each of the two sets, two cross-heads connected respectively to said two rings, a toothed ring, and revolving pinions meshing with said toothed ring, said pinions having each, two points or cranked portions diametrically opposite one another connected directly and respectively to the two cross-heads.

2. In an engine of the described class, two sets of pistons revolving in the interior of an annular chamber two discs or rings mounted loose upon the shaft of the engine, said rings carrying fixed respectively the pistons of each of the two sets, two cross-heads attached respectively to the two rings which carry the pistons, and provided with radial guides, a toothed ring, pinions which revolve meshing with said ring, a shaft revolving in bearings of a frame fixed to the engine shaft and carrying said pinions, this shaft having two eccentric points or cranks diametrically opposite, which slide in the radial guides of said cross-heads.

3. In an explosion motor of the described class, the combination of an annular chamber in the interior of which revolve two sets of pistons, two discs or rings mounted loose upon the engine shaft and which carry respectively fixed the pistons, of each of the two sets, two cross-heads provided with slots or radial guides connected respectively to the two rings which carry the pistons, a frame, a shaft mounted in bearings of this frame and carrying at each end a pinion, two toothed rings with which mesh the pinions at the same time that they revolve, said pinion shaft having two eccentric points or cranks carrying blocks which slide in the slots or radial guides of said cross-heads.

4. In an engine of the described class, two sets of pistons revolving in the interior of an annular chamber, two rings mounted on the engine shaft which carry respectively fixed each of the two sets of pistons, two cross-heads connected to said ring and having radial slots, a frame connected to the engine shaft, two toothed rings, crank shafts forming cranks diametrically opposite mounted in bearings of said frame, two pinions mounted on the ends of said crank shafts which pinions revolve meshing with said toothed rings, the cranks of said crankshaft carrying blocks which slide in the radial slots of said cross-heads in order that the epicyclic or hypocyclic movement of the two cranks of the crank shaft be directly transmitted by means of said cross-heads to the rings which carry the pistons and by this manner the movement of the two sets of pistons in the interior of the annular chamber be controlled.

In testimony whereof I affix my signature.

JOSÉ FONS PONT.